(12) United States Patent
Lang

(10) Patent No.: US 6,325,519 B1
(45) Date of Patent: *Dec. 4, 2001

(54) REPLACEABLE REAR VIEW MIRROR FOR MOTOR VEHICLES

(75) Inventor: Heinrich Lang, Ergersheim (DE)

(73) Assignee: MEKRA Lang GmbH & Co. KG, Furth (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/303,706

(22) Filed: May 3, 1999

Related U.S. Application Data

(62) Division of application No. 08/835,158, filed on Apr. 4, 1997.

(30) Foreign Application Priority Data

Apr. 6, 1996 (DE) .......................................... 296 06 417 U

(51) Int. Cl.$^7$ .................................................... G02B 7/182
(52) U.S. Cl. ......................... 359/871; 359/881; 248/477
(58) Field of Search ..................... 359/864, 865, 359/871, 872, 881; 248/223.31, 477, 480, 481, 488

(56) References Cited

U.S. PATENT DOCUMENTS

| 3,563,638 | 2/1971 | Panozzo . | |
|---|---|---|---|
| 4,197,762 | * 4/1980 | Yamana | 74/501 M |
| 4,488,778 | 12/1984 | Polzer . | |
| 4,764,004 | 8/1988 | Yamada et al. . | |
| 4,867,408 | 9/1989 | Ozaki . | |
| 4,877,214 | * 10/1989 | Toshiaki et al. | 248/483 |
| 4,988,178 | 1/1991 | Eifert . | |
| 4,991,950 | 2/1991 | Lang et al. . | |
| 5,110,196 | 5/1992 | Lang et al. . | |
| 5,137,247 | 8/1992 | Lang et al. . | |
| 5,311,368 | 5/1994 | Tsuyama . | |
| 5,355,255 | 10/1994 | Assinder . | |
| 5,363,246 | 11/1994 | Perry et al. . | |
| 5,467,230 | 11/1995 | Boddy et al. . | |

(List continued on next page.)

FOREIGN PATENT DOCUMENTS

| 2907433 | 9/1980 | (DE) . |
|---|---|---|
| 3049169A1 | 7/1982 | (DE) . |
| 3825648A1 | 7/1988 | (DE) . |
| 0609508A1 | 11/1993 | (EP) . |
| 1095331 | 12/1967 | (GB) . |

OTHER PUBLICATIONS

Abstract for German Patent No. DE 30 49 169 A1.
Search Report, EPO Application No. EP 97104563.8, dated Jan. 7, 1997.

*Primary Examiner*—Mark A Robinson
(74) *Attorney, Agent, or Firm*—Dority & Manning, P.A.

(57) ABSTRACT

A mirror carrier plate assembly is disclosed and is slidably engageable along a sliding direction by a holding plate of a mirror housing for securing the mirror carrier plate to the housing, the holding plate having a first surface opposing the mirror carrier plate, a second surface opposite the first surface, and at least one receiving channel extending from the second surface, the holding plate defining a penetration opening therethrough adjacent the receiving channel. The mirror carrier plate assembly includes a substantially planar mirror carrier plate having a first surface for receiving a mirror and a second surface opposite the first surface, and at least one anchoring element extending from the second surface of the mirror carrier plate, the anchoring element configured to extend through the penetration opening and into the receiving channel, and being slidably receivable in the receiving channel in the sliding direction. A related rear view mirror assembly is also disclosed.

12 Claims, 11 Drawing Sheets

U.S. PATENT DOCUMENTS

| | | |
|---|---|---|
| 5,568,326 | 10/1996 | Yoshida et al. . |
| 5,583,703 | 12/1996 | Lang et al. . |
| 5,604,644 | 2/1997 | Lang et al. . |
| 5,610,772 | 3/1997 | Iizuka . |
| 5,615,054 | 3/1997 | Lang et al. . |
| 5,621,577 | 4/1997 | Lang et al. . |
| 5,721,646 | 2/1998 | Catlin et al. . |
| 5,760,980 | 6/1998 | Lang . |
| 5,798,882 | 8/1998 | Lang . |
| 5,889,627 | 3/1999 | Englander et al. . |

* cited by examiner

REPLACEABLE REAR VIEW MIRROR FOR MOTOR VEHICLES

RELATED APPLICATIONS

The present application is a divisional application claiming priority under 35 § 120 to U.S. Pat. application Ser. No. 08/835,158, filed Apr. 4, 1997.

BACKGROUND OF THE INVENTION

The invention is generally concerned with a replaceable mirror for motor vehicles and is more particularly concerned with a replaceable mirror having a slidable mirror carrier plate.

A rear view mirror arrangement of this type is known from EP 0 609 508 A1. In the case of this rear view mirror arrangement, a sliding connection between a holding plate for a removable installation of a rear view mirror in a housing and the mirror carrying plates is carried out by a clamp lock device. The latter can function in practice in that the holding plate is provided with projections in the area of two, oppositely disposed, parallel side edges which, during clamping, can be pushed parallel to the plane of the plate into complementary shaped depressions on the back of the mirror carrier plate.

This previously known sliding arrangement is characterized by a stable mounting and good withdrawal of the mirror carrier plate away from the holding plate. However, this design is complex in its molding technology, since connection projections are to be provided on the holding plate as well as the complementary shaped rear depressions on the mirror carrying plate. Moreover, in the sliding of the mirror carrier plate onto the holding plate, though seemingly simple of itself, in practice the projections on the holding plate must be intuitively maneuvered into the complementary shaped depressions of the rear area of the mirror carrier plate.

OBJECTS AND SUMMARY OF THE INVENTION

Basing consideration on the problems recited above, it is an object of the invention to improve the sliding connection between the holding plate and the mirror carrying plate, so that the manufacture and the manipulation work for the mirror arrangement is reduced.

This purpose will be achieved by means of the present invention. In accord with the invention, on the one hand there may be provided at least one open insert channel, groove-like in shape and aligned along the holding plate plane, into which a complementary anchoring piece on the mirror carrier plate can slide, parallel to the plane of the holding plate, during replacement closure. On the other hand, a mirror carrier plate may be provided as a slide-in connection possessing a trapezoidal periphery. This has inwardly-turned clips correspondingly trapezoidally arranged, parallel to the plane of the holding plate. These clips, during a motion of sliding in along the plane of the holding plate, embrace receiving clips curved outwardly on the rim of the holding plate which has a periphery complementary to the above.

To achieve a solid connection between the holding plate and the mirror carrier plate, both of the above outlined preferred methods of slide connection for the rear view mirror arrangements can be realized, however, only one of the two methods of sliding together at a time is possible. In addition it must be mentioned, that the functional assignment of the individual designs of the slide-connection in accord with the invention as to holding plate or mirror carrier plate, can be reversed.

In the case of the two provided sliding connection methods in accord with the invention, either is of advantage, in that in spite of a very short slide movement, a stable and in the case of commercial vehicles, an enduring fastening of the mirror carrier plate, and thereby the mirror glass, on the holding plate is achieved. This is more supported by the trapezoidal "wedge" action of the securement fittings, which calls forth a precise securement positioning of the mirror carrier plate on the holding plate at the full stop point of the sliding final position.

BRIEF DESCRIPTION OF THE DRAWINGS

Preferred arrangements, additional features, details and advantages of the invention are to be gained from the dependent claims and the following descriptions, in which following embodiments and with the aid of the enclosed drawings all of which are explained in greater detail. The following shows in:

DETAILED DESCRIPTION OF THE PREFERRED EMBODIMENTS

Figure 1:
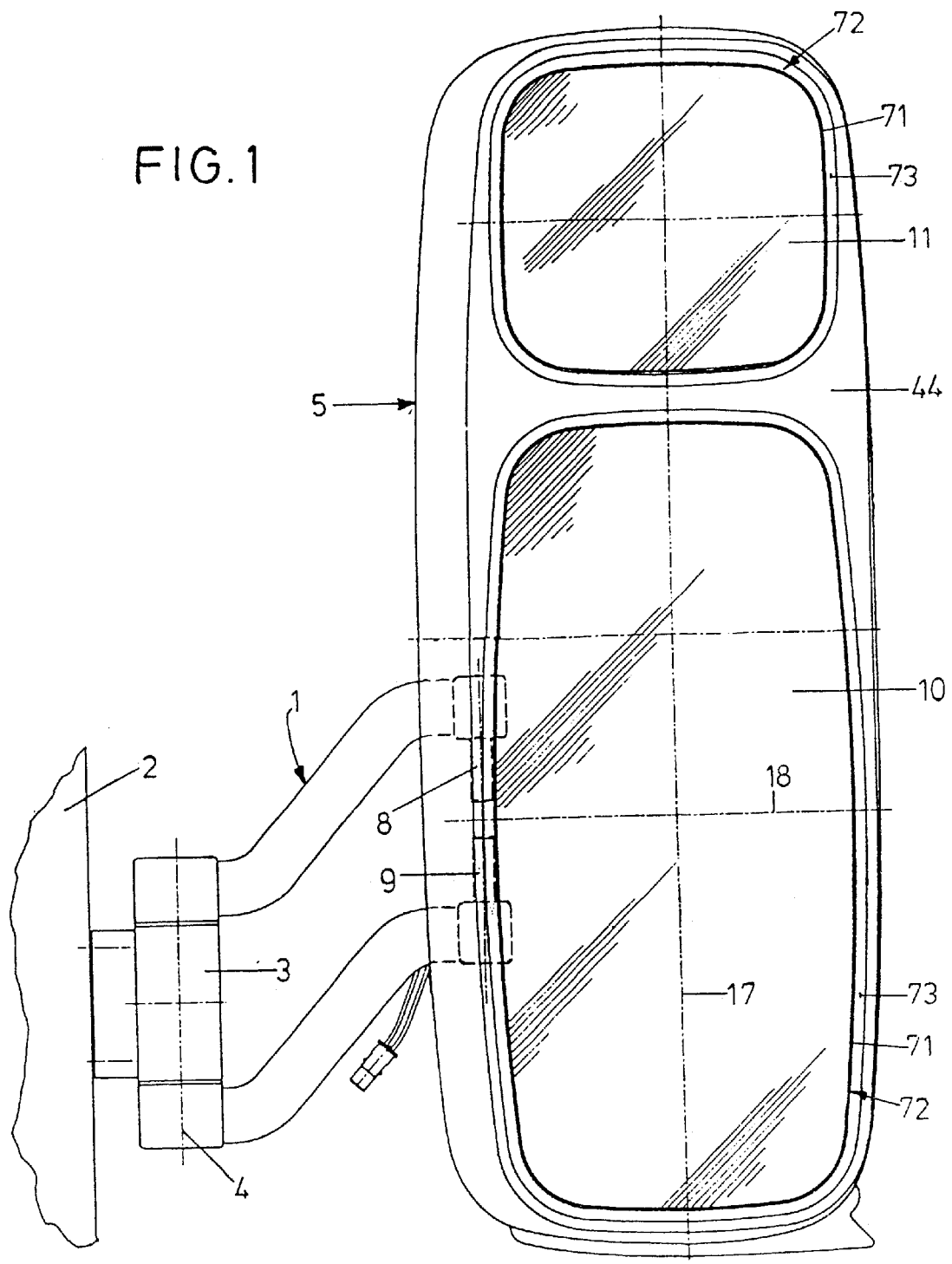
FIG. 1 an external mirror in accord with the invention in plan view.

Reference will now be made in detail to the presently preferred embodiments of the invention, one or more examples of which are illustrated in the drawings. Each example is provided by way of explanation of the invention, and not meant as a limitation of the invention. For example, features illustrated or described as part of one embodiment of the invention can be used on another embodiment to yield yet another embodiment. It is intended that the present invention include such modifications and variations.

Figure 2:
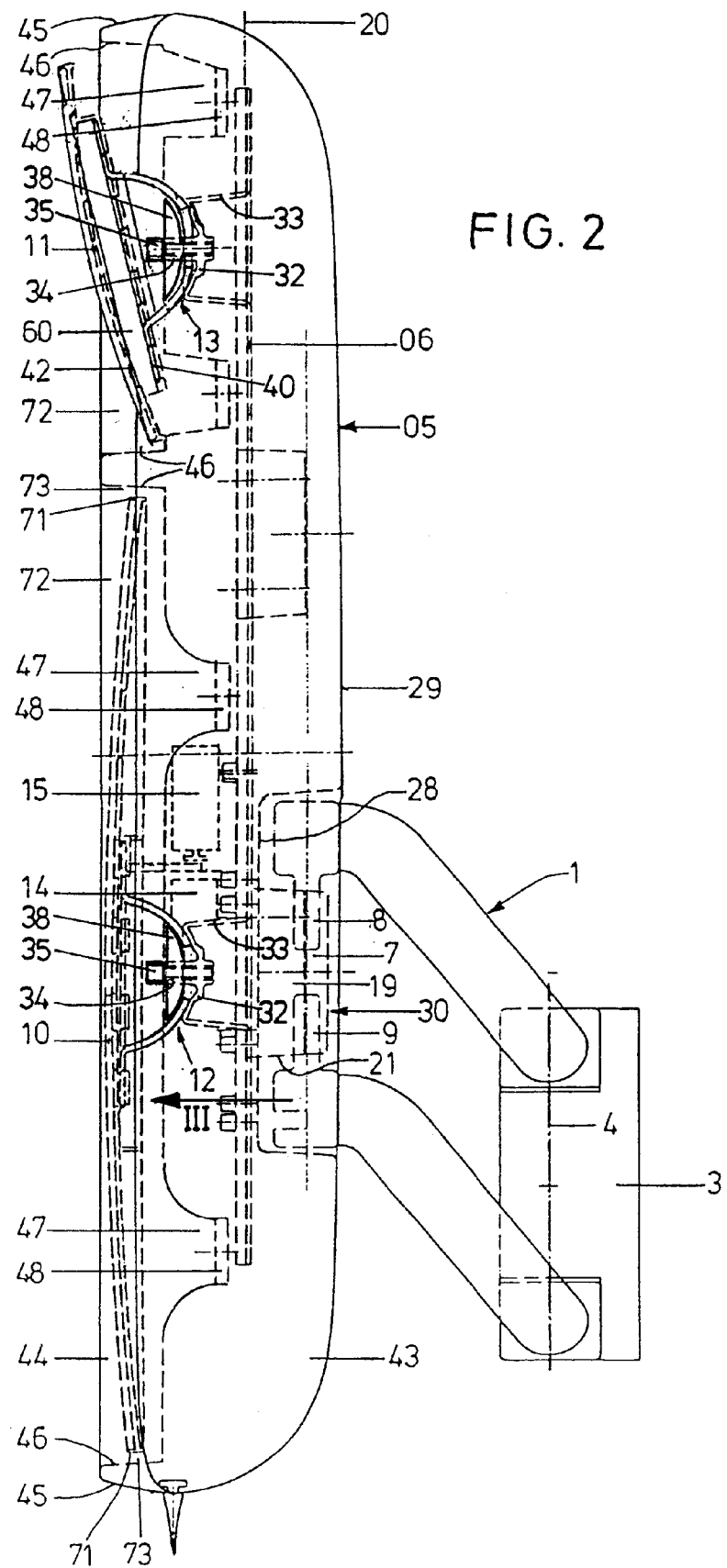
FIG. 2 a side view of the mirror in accord with FIG. 1.

The external mirror presented in FIGS. 1, 2 for a commercial motor vehicle is constructed as a double mirror. It possesses a holder in the form of a double armed support 1 for the fastening of the mirror on a schematically indicated body part 2 of a commercial vehicle. The double support arm 1 is affixed to the vehicle body by a bracket 3 which is swingable about vertical axis 4.

In an aerodynamic shaped mirror housing 5 a back plate 6 is arranged which is fastened by means of an attachment means 7 on the two holding pins 8,9 on the free end of the double arm support 1. The housing 5 is supported directly on this back plate 6. At appropriate points the back plate 6 can show designed cutouts, which are not further detailed, to reduce weight.

Two mirror panes, 10, 11 are each swivelably secured to the back plate 6 by movable supporting hemispheres 12, 13 respectively. The lower mirror pane exhibits only a lightly convex main mirror pane, the upper mirror pane 11 is a smaller wide angle mirror.

The lower mirror 10 is served by two adjustment means, 14,15 in the form of electrical motor-drive sets which are coupled to the mirror 10 by means of a stepless crank drive 14, 15 which will not be further described. By means of the adjustment aggregates 14, 15, the mirror 10 can be adjusted through two adjustment axes 17, 18.

The holding apparatus 7 is designed as a clamping mechanism, the clamp abutment 19 thereof being integral with the back plate 6 and serving also for the holding pins 8,9. The abutment 19 is installed on the free end of a square projection 21 extending out of plane 20 of the back plate 6. By means of a fastening screw (not shown) a clamping jaw is lockingly bindable to the clamp abutment 19, whereby the back plate 6 is firmly affixed with the holding pins 8, 9 of the support arms 1 when the clamping closure of the clamping device takes place. Further detail on this point is obtainable in the introduction in EP-609 508 A1.

In the assembly drawing shown in FIG. 2, the projection 21 penetrates through a not shown housing opening, which is found in angular base 28 of a housing recess 30 on the outer housing side 29. The clamp abutment 19 and the clamping jaw of the clamping apparatus 7 are also on the outside of the housing 29 and installed in this housing recess 30, thereby being easily accessible for a mounting of both mirror and support arm 1.

For the installation of the two swivelable support hemispheres 12, 13, the description will be that of the under support hemisphere 12 for the lower mirror 10. The upper swivelable support hemisphere is correspondingly the same.

The swivelable bearing 12 is designed as a spherical ball joint installed on the back plate 6, wherein the bearing shell 32 of the ball joint is integral with the back plate 6. The bearing shell 32 is then installed at the free end of a ring-shaped projection 33 protruding from the plate plane 20 of the mirror back plate 6. Centrally, the bearing shell 32 exhibits as an integral part a horizontally projecting, threaded sheath 34 in which a fastening screw 35 is threadedly engaged for a not further shown abutment flap which surmounts the threaded sheath 34. A compression spring is supported therefrom which acts upon a spherical segment shaped forcing element 38 in the direction of the bearing shell 32 of the swivelling support 12.

Between the pressing element 38 and the bearing shell 32 runs a hemispherical counter shell 39 for the mirror 10, and which is molded on a flat holding plate 40. This counter shell 39 shows a central opening 41, through which the threaded sheath 34 moves when in use. On the holding plate 40 a mirror carrier plate 42 is releasably fastened, to which the mirror 10 is permanently affixed by adhesive.

As becomes further plain from FIGS. 1,2, the housing 5 is two pieced, comprised of a main piece 43 and a framing 44 which conforms to the surrounding sides of the mirrors 10,11. The framing 44 exhibits in this function an outer lying peripheral area 45 as well as the peripheries of the mirrors 10,11, and said framing 44 is further provided with offset, flanking, inner lying wall sections 46. Of these, there protrudes in the direction of the back plate 6, integral, molded bracing members 47, which, between the ends thereof, respectively a holding tab 48 is found running parallel to the back plate 6. With these retaining tabs 48 the framing 44 is integrally affixed to the molded fastening means of the back plate 6.

The releasable fastening of each mirror carrier plate 42 to the extended holding plate 40 which is integral with the counter bearing shell hemisphere 39 of the swivelable mirror support 12, 13, is described for additional embodiments in more detail with the help of drawings FIG. 3 to FIG. 11.

Figure 3:
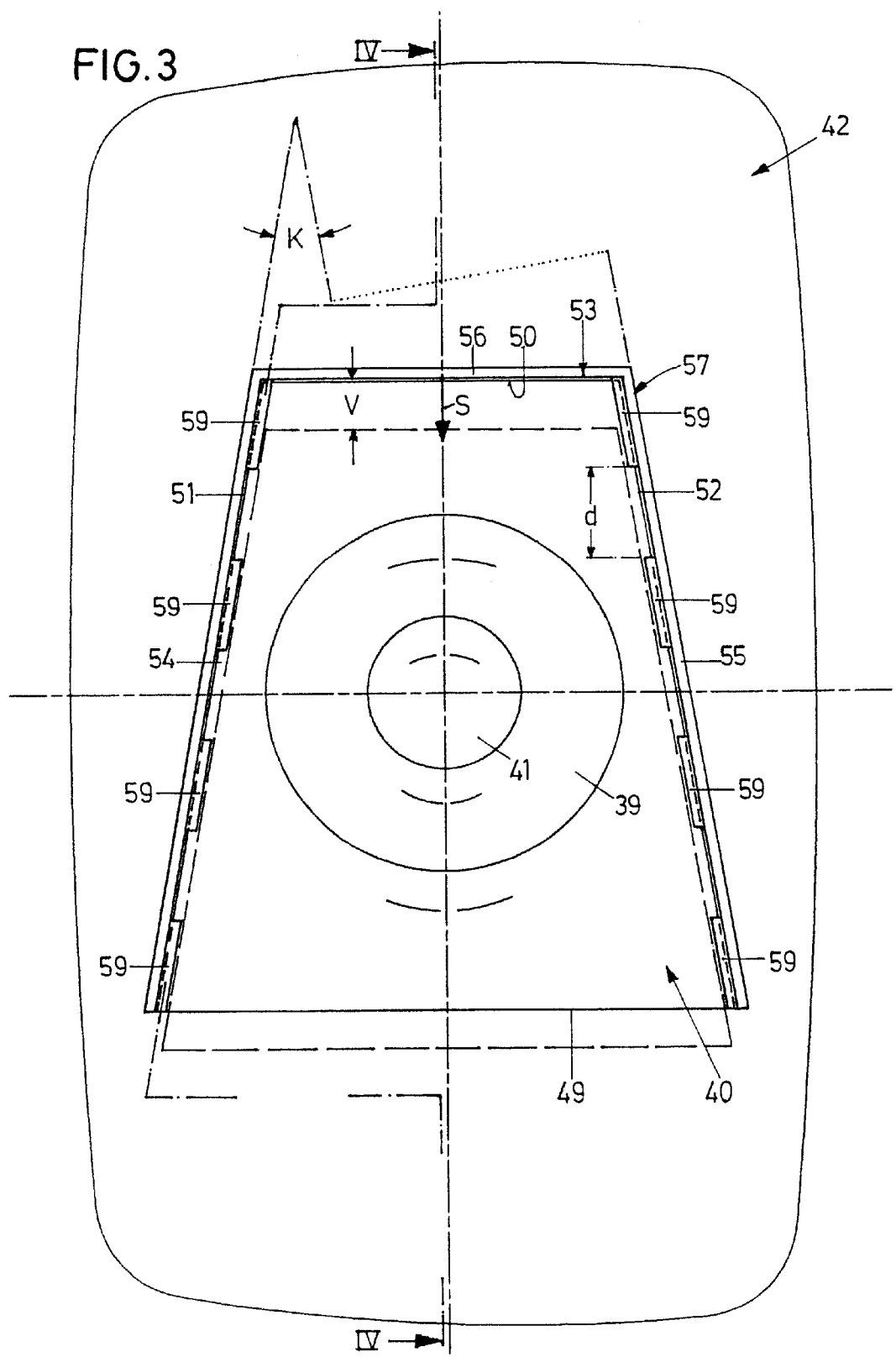
FIG. 3 a plan view of a holding plate and a mirror carrier plate in combined position according the arrow direction of FIG. 2, FIG. 4 a section through the plate arrangement along the Section Line IV—IV in accord with FIG. 3, FIG. 5 a plan view of a holding and mirror carrier plate in combined position in a second embodiment, FIG. 6 a presentation analogous to FIG. 5 in a third embodiment of the sliding arrangement, FIG. 7 a section in accord with section line VII—VII of FIG. 6, FIG. 8 a presentation analogous to FIG. 5 in a fourth embodiment of the sliding arrangement, FIG. 9 a section along the section line IX—IX of FIG. 8, FIG. 10 a presentation analogous to FIG. 5 in a fifth embodiment of the sliding arrangement, and FIG. 11 a section along the section line IX—IX in accord with FIG. 10.
Figure 4:
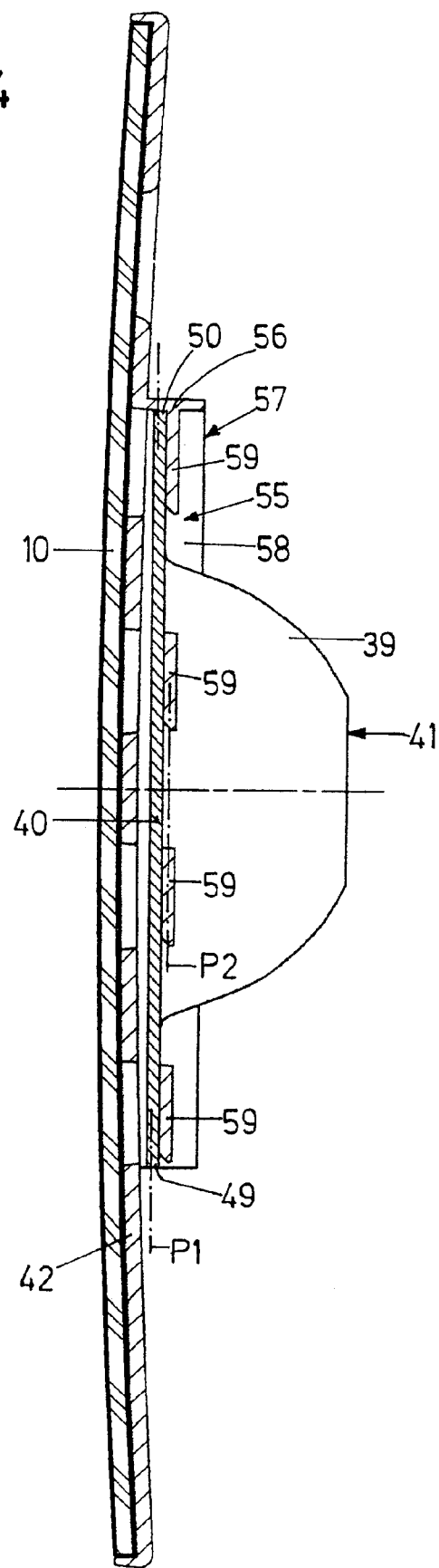

FIGS. 3,4 show a first basic type of the releasable sliding connection between the holding plate 40 and the mirror carrier plate 42 of the present fastening.

The holding plate 40, in plan view is designed trapezoidal with a bottom base side 49, a top side 50 parallel thereto and two sides 51 and 52. Centrally located, as shown in FIG. 3 and FIG. 4 once again is apparent the counter bearing shell 39 with the opening 41 for the swivelling support 12. The sides 49 to 52 of the holding plate 40 are complementary to a designed general marking of 53 for a wedge shaped peripheral area on the mirror carrier plate 42. This peripheral area 53 is bordered by three support pieces, 54, 55, and 56, which, as is plain on FIG. 3, are continuous around the two sides plus the short top base to realize a partial trapizoidal collar 57. The wedge-type design of the peripheral area, that is, the support pieces 54 and 55 arises from the slanted arrangement of the two support pieces 54, 55, which form the indicated wedge angle k. From the inside 58 of the two side support pieces 54, 55 there projects respectively at about half the height and toward the inside, fastening projection clips with a spatial interval of "d" running in a plane P2. The gripping projection clips 59 lie at a distance from the actual mirror carrier plate which represents about half the thickness of the holding plate 40.

For assembly of the mirror carrier plate 42, with the mirror 10 on the holding plate 40, the mirror carrier plate 42, in accord with the assembly end positioning as seen in FIGS. 3 and 4, is set above on the holding plate 40 and subsequently pushed in the direction indicated by the slip direction "S". After being so slipped together, the sides 51, 52 and the upper base short side 50 of the holding plate 40 lie on the corresponding side positions 54, 55, and 56 of the mirror carrier plate, whereby simultaneously the clip projections 59 grip the named sides 51, 52 of the holding plate.

Figure 5:
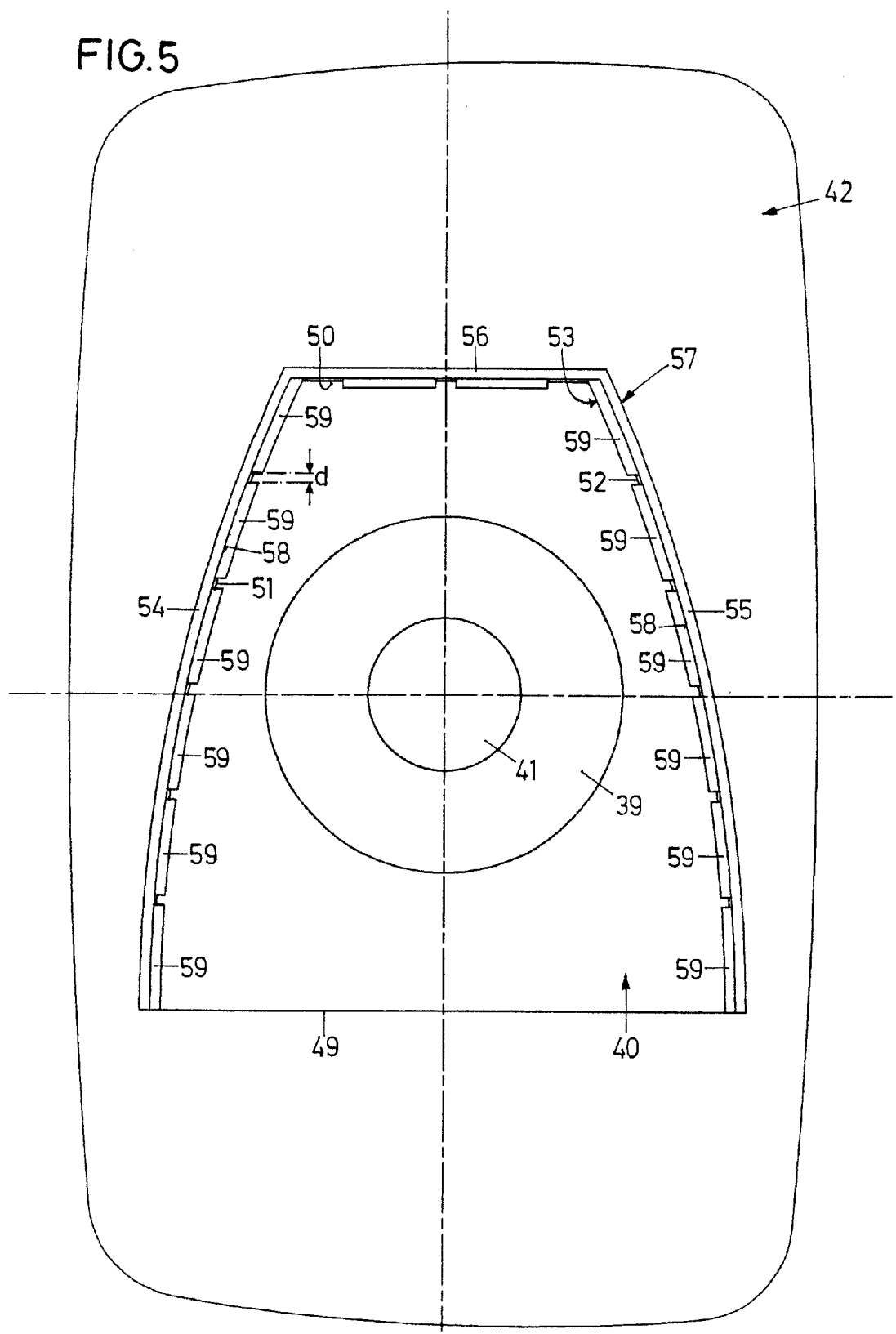

The embodiment shown in FIG. 5 differs from that in accord with FIGS. 3 and 4, principally in that the straight sides 51, 52 of the holding plate 40 are curved outwardly. In complementary manner thereto, the side support pieces 54, 55 have also a correspondingly curved outline. The holding projections 59 are not only available on the sides 54, 55, but also on the base side 56. The interval offsetting them "d" is greatly reduced as compared to the previous embodiment.

The assembly method for the embodiment in accord with FIG. 5, is little changed from that of the embodiment shown in FIGS. 3 and 4.

Figure 6:
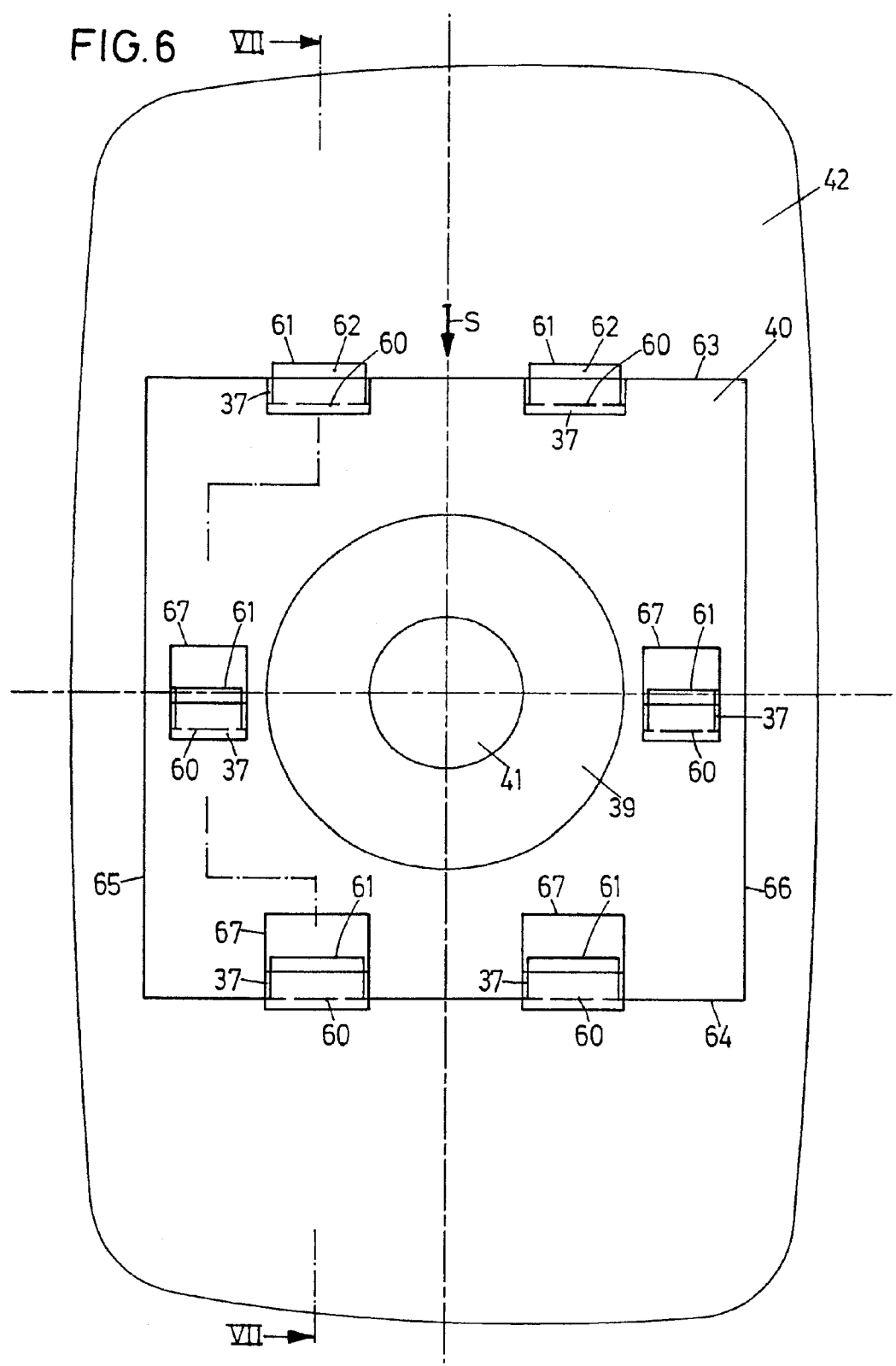
Figure 7:
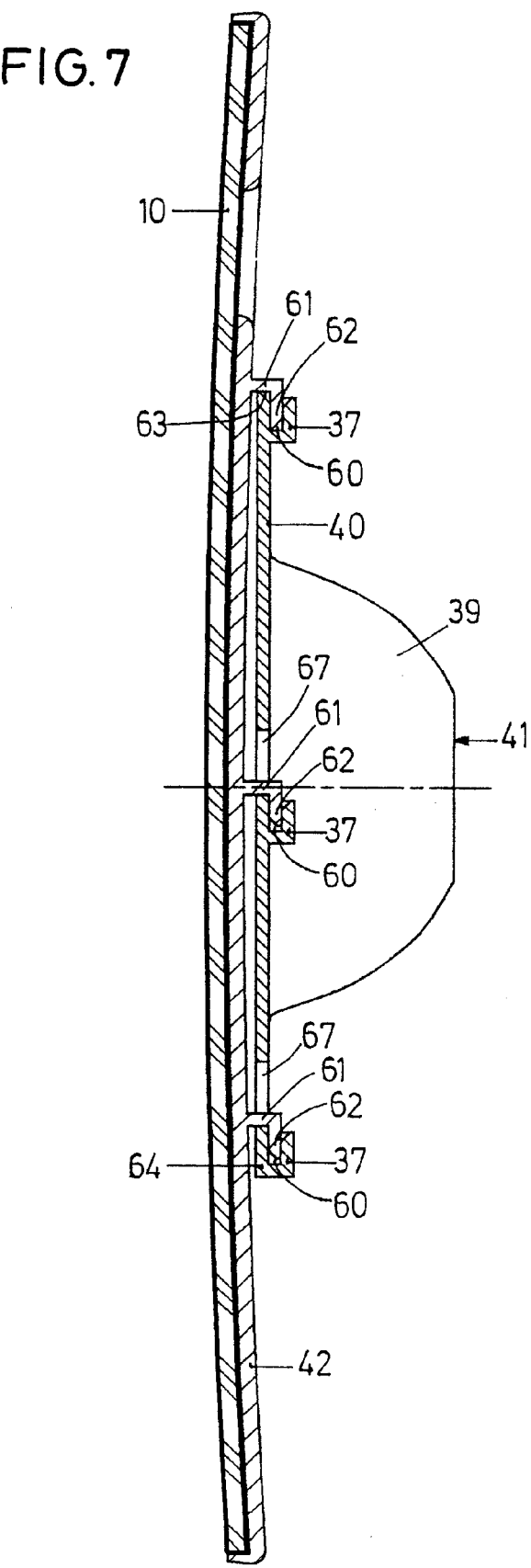

With the aid of FIGS. 6 and 7, the second fundamental slip connection design in accord with the invention which is to be described. Basically, in this case the matter proceeds from a groove shaped reception channel 60 in the holding plate 40, which is formed by a sprayed on, angular projection tab 37 which is integral with the holding plate 40. Each receiving channel 60 is in the direction of the plate plane P1, open toward the top and serves for the reception of a complementary anchoring piece 62, which is oriented downward in the opposite direction from the open side of the reception channel 60 and is formed by an angular projection on the mirror carrier plate.

As is made plain by FIGS. 6 and 7, there are, in the case of the embodiment there shown, six groove characterized reception pieces 60 about the counter bearing shell 39 and along the right angled arranged sides 63, 64, 65, 66 of the holding plate 40 on the rear side of the holding plate 40 facing away from the mirror carrier plate 42. Two of the receiving channels lie in the area of the upper side 63, two in the area of the lower side 64 and two at half the distance between the counter bearing shell 39 and the vertical sides 65, 66. So that the four last named reception channels 60 are accessible for the respective complementary angular projections 61 of the mirror carrier plate 42, in front of the open side of these reception grooves is often a penetration 67 is made in the holding plate 40 through which the respective angular projection lockingly protrudes.

For the assembly of the mirror carrier plate 42 onto the holding plate 40, the angular projections 61 of the mirror carrier plate 42 with their anchoring pieces 62 are brought in front of the receiving channels 60 and the mirror carrier plate is pushed in the direction "S". Thereby, the anchoring pieces 62 lockingly engage in the respective receiving channels 60 and there, preferably in place, are releasably fastened.

Figure 8:
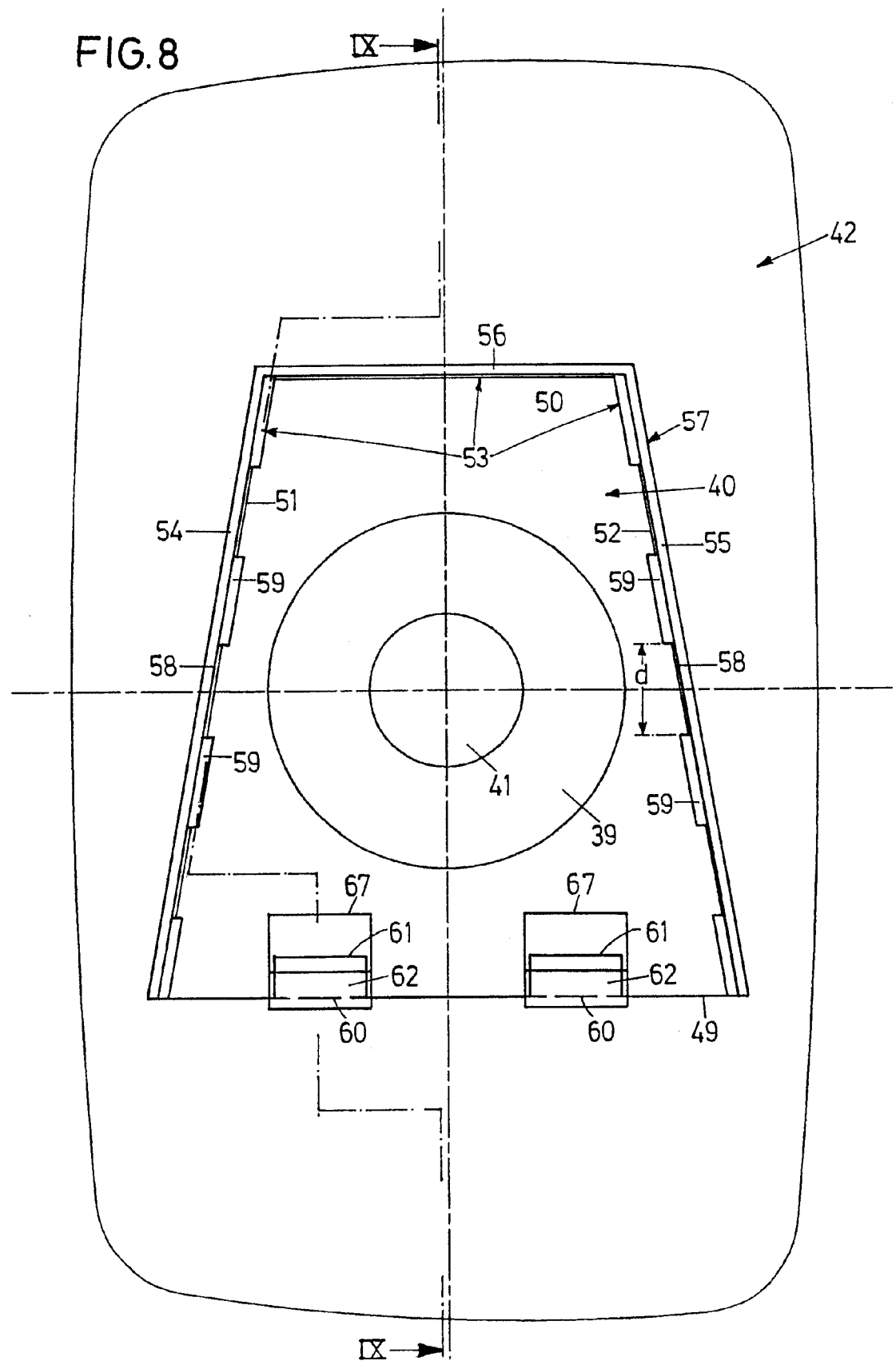
Figure 9:
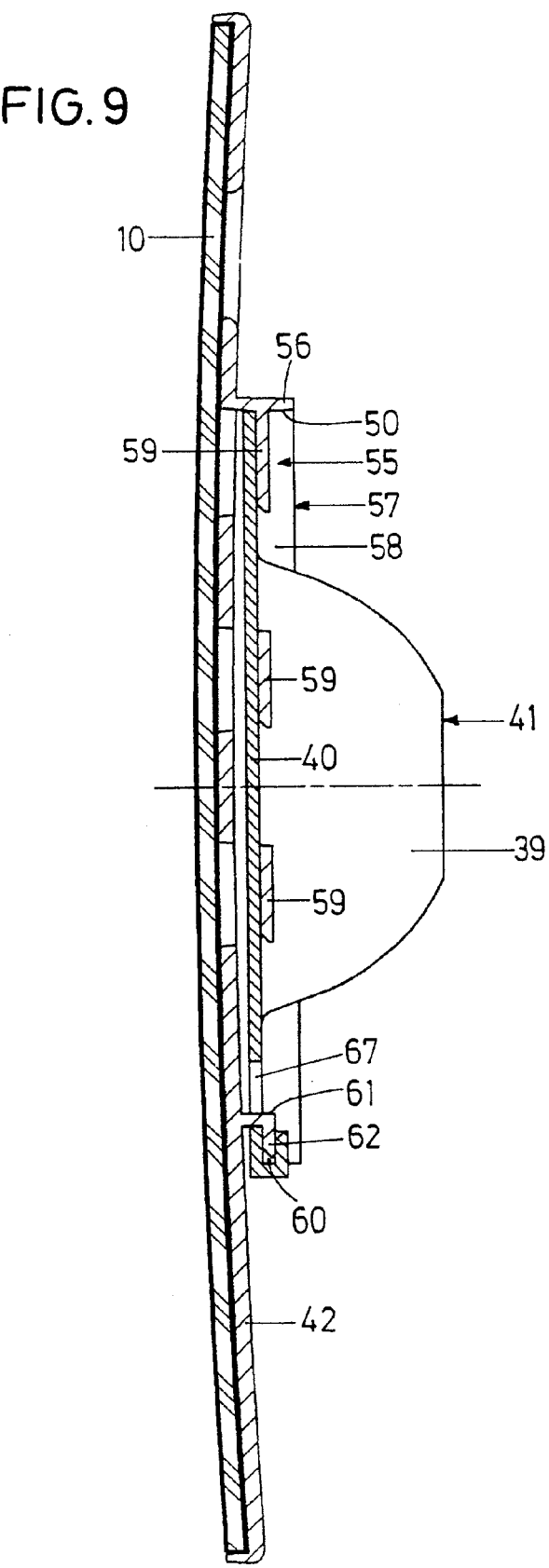

The embodiment of the manner of connection between holding plate 40 and the mirror carrier plate 42 shown in FIGS. 8 and 9 presents practically a combination of the designs indicated in FIGS. 3 and 4 and FIGS. 6 and 7.

Once again a trapezoidal holding plate 40 is provided which works in conjunction with a corresponding, wedge-like periphery 53, formed from trapezoidal support collar 57 on the mirror carrier plate 42. Further on the lower end of the holding plate 40, two receiving channels 60 analogous to two lower receiving channels 60 on the square holding plate 40 as in FIG. 6 are provided, in which once again the corresponding anchoring pieces 62 of the mirror carrier plate fit.

As to the remainder, for coinciding construction pieces the identical reference numbers have been used, so that a further detailed description of the embodiments shown in FIG. 8 and FIG. 9 would be redundant. These are evident without any additional comments from the description of FIGS. 3, 4, 6, and 7.

Figure 10:
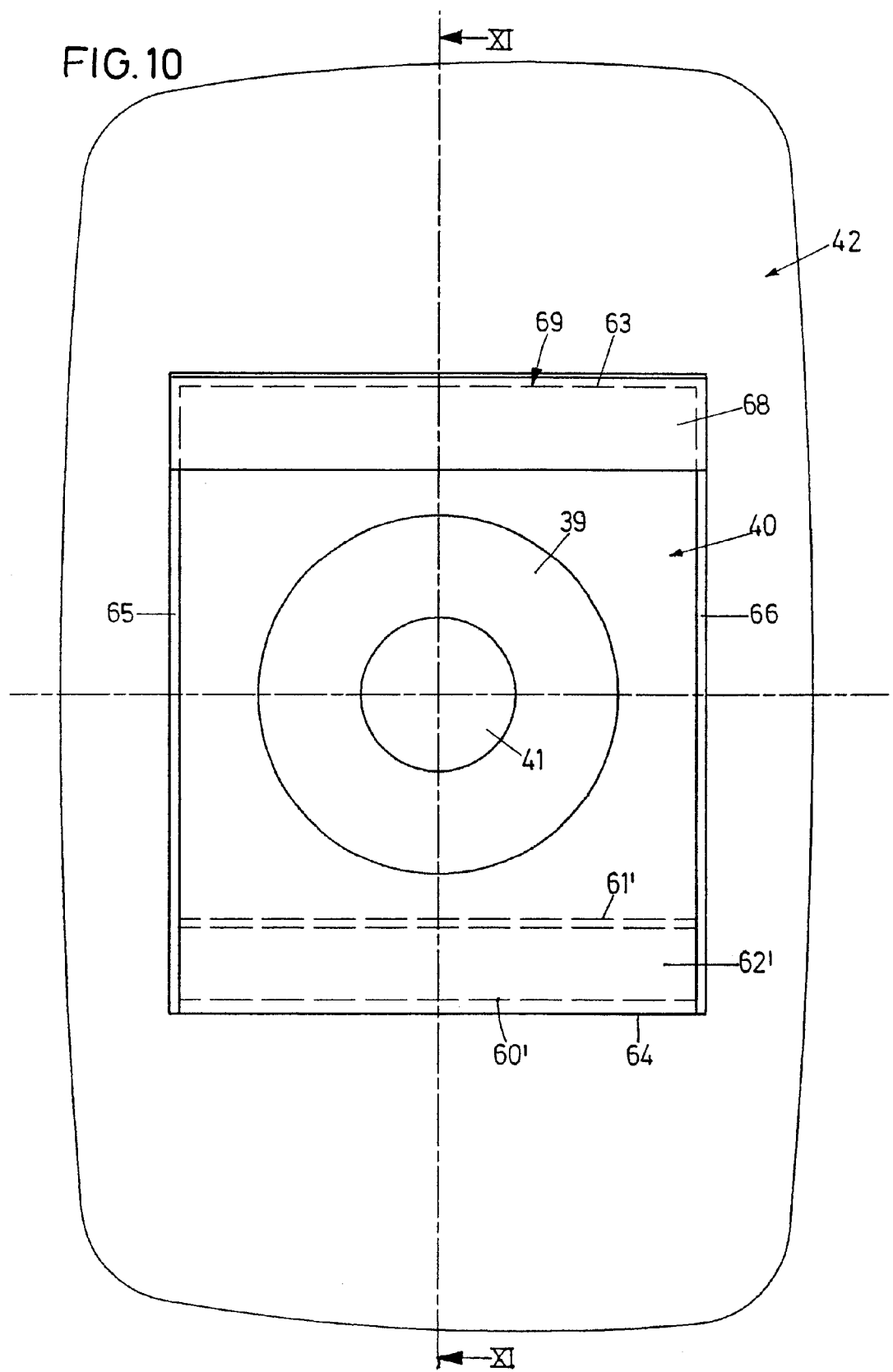
Figure 11:
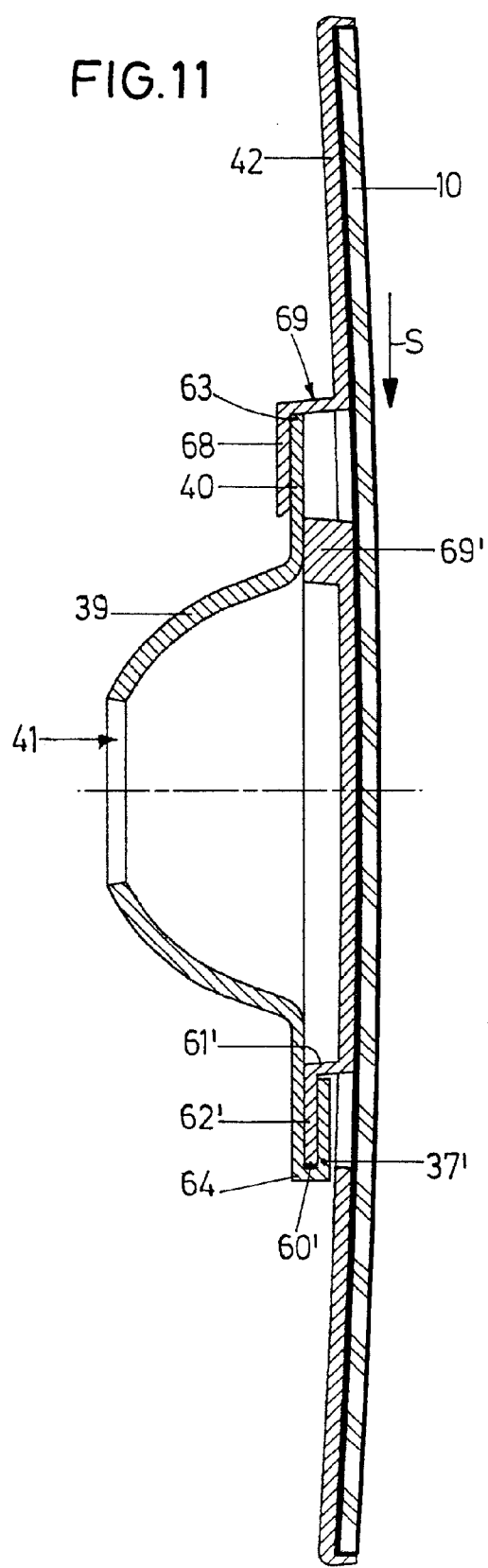

Finally in FIG. 10 is a further alternative for the basic fastening construction as presented in the FIGS. 6 and 7. In this case a right angled holding plate 40 is provided, on the lower side of which a receiving channel 60' extends over the entire width. The latter is again formed from a sprayed-on angular projection 37' and lies, contrary to the previously described embodiments, on the side of the holding plate 40 facing the mirror carrier plate 42. On the mirror carrier plate 42, again an angular projection 61' is molded on, which extends to the receiving channel 60' a complementary anchorage piece 62'.

Over the top side 63 of the holding plate 40, which side is oppositely disposed to the receiving channel 60', is a complementary, molding like counter piece 68 which is slidable over the holding plate 40 and which was formed from a corresponding angular offset 69. The mirror carrier plate 42 is further provided with a rib 69' upon which the upper rim area of side 63 is supported, as shown in the assembly drawing, FIG. 11.

For the placement of the mirror carrier plate 42, this is again placed on the holding plate 40 aligned in the sliding direction S at the measured width of the anchoring piece 62' below and, of course, the corresponding width of the counter piece 68 above and then pushed in said sliding direction S downward. When this is done, the anchoring piece 62' enters the corresponding receiving channel 60' in a tight fit. At the same time, the counter piece 68 moves to engage behind the upper side area 63 of the holding plate 40 whereby a stable connection between the two plates 40, 42 is created.

The relative displacement between the holding plate 40 and the mirror carrier plate 42 is, in general, greater than the remaining offset opening 73 between the outer edge 71 of the mirror carrier plate 42 and the housing opening 72 which latter follows the peripheral zone 46 about the mirrors (FIGS. 1 and 2). On this account, in a normal rear view positioning of the mirror, as it is shown in FIG. 2 for the lower main mirror 10, the mirror carrier plate 42 is so encompassed by the housing 5 that a complete release of the sliding contact between the mirror carrier plate 42 and the holding plate 40 is impossible. Before the sliding contact between said plates 40, 42 is released, the mirror carrier plate 42 impinges on the corresponding wall section 46 of the housing.

Only if the component group of the mirror carrier plate 42 and the holding plate 40 with the aid of the swiveling supports 12, 13, is tilted in an extremely pitched assembly position, as is indicated by the position of the auxiliary mirror 11 in FIG. 2, can the mirror carrier plate 42 be completely pushed out of the final mounted position as shown in the dotted lines of FIG. 3 and lifted from the holding plate 40. The extraction of the mirror carrier plate 42 and its replacement is thus only possible in such an extremely tilted position.

It will be apparent to those skilled in the art that various modifications and variations can be made in the present invention without departing from the scope and spirit of the invention. It is intended that the present invention include such modifications and variations as come within the scope of the appended claims and their equivalents.

What is claimed is:

1. A mirror carrier plate assembly slidably engageable along a sliding direction by a holding plate of a mirror housing for securing the mirror carrier plate to the housing, the holding plate having a first surface opposing the mirror carrier plate, a second surface opposite the first surface, and at least one receiving channel extending from the second surface and being defined by a first part extending substantially perpendicular to the holding plate second surface and the sliding direction and a second part extending from the first part substantially parallel to the holding plate second surface, the second part having a distal end extending substantially opposite the sliding direction, the holding plate defining a penetration opening therethrough disposed adjacent the receiving channel in a direction substantially opposite the sliding direction, the mirror carrier plate assembly comprising:

a substantially planar mirror carrier plate having a first surface for receiving a mirror and a second surface opposite the first surface; and at least one anchoring element extending from the second surface of the mirror carrier plate, the anchoring element configured to extend through the penetration opening and into the receiving channel, each of the anchoring elements including a first part extending substantially perpendicular to the mirror carrier plate second surface and the sliding direction and a second part extending from the first part substantially parallel to the mirror carrier plate second surface, the anchoring element second part having a distal end extending substantially in the sliding direction, the anchoring element second part being slidably receivable in the receiving channel in the sliding direction.

2. The assembly of claim 1, wherein at least six anchoring elements are provided about the mirror carrier plate for being received in six correspondingly located receiving channels.

3. The assembly of claim 1, wherein at least one of the receiving channels is formed at a top side of the holding plate.

4. The assembly of claim 1, wherein each anchoring element has an L-shaped cross-section.

5. The assembly of claim 1, wherein each holding plate first and second part of a given receiving channel have an L-shaped cross-section.

6. The assembly of claim 1, wherein each receiving channel extends substantially perpendicular to the sliding direction.

7. A rear view mirror assembly comprising:

a housing;

a holding plate secured to the housing, the holding plate having a first surface and a second surface opposite the first surface, and at least one receiving channel extending from the second surface and being defined by a first part extending substantially perpendicular to the holding plate second surface and the sliding direction and a second part extending from the first part substantially parallel to the holding plate second surface, the second part having a distal end extending substantially opposite the sliding direction, the holding plate defining a penetration opening therethrough disposed adjacent the receiving channel in a direction substantially opposite a sliding direction;

a substantially planar mirror carrier plate having a first surface for receiving a mirror and a second surface opposite the first surface, the mirror carrier plate being slidably engageable along the sliding direction with the holding plate;

a mirror secured to the first surface of the mirror carrier plate; and at least one anchoring element extending from the second surface of the mirror carrier plate, the anchoring element configured to extend through the penetration opening and into the receiving channel, each of the anchoring elements including a first part extending substantially perpendicular to the mirror carrier plate second surface and the sliding direction and a second part extending from the first part substantially parallel to the mirror carrier plate second surface, the anchoring element second part having a distal end extending substantially in the sliding direction, the anchoring element second part being slidably receivable in the receiving channel in the sliding direction.

8. The assembly of claim 7, wherein at least six anchoring elements are provided about the mirror carrier plate for being received in six correspondingly located receiving channels.

9. The assembly of claim 7, wherein at least one of the receiving channels is formed at a top side of the holding plate.

10. The assembly of claim 7, wherein each anchoring element has an L-shaped cross-section.

11. The assembly of claim 7, wherein each holding plate first and second part of a given receiving channel have an L-shaped cross-section.

12. The assembly of claim 7, wherein each receiving channel extends substantially perpendicular to the sliding direction.

* * * * *